United States Patent

[11] 3,603,517

| [72] | Inventors | William N. McDonald;<br>William M. Hogan, both of Little Rock, Ark. |
|---|---|---|
| [21] | Appl. No. | 790,925 |
| [22] | Filed | Jan. 14, 1969 |
| [45] | Patented | Sept. 7, 1971 |
| [73] | Assignee | A. O. Smith Corporation<br>Milwaukee, Wis. |

[54] FIBER BAND REGULATOR FOR FIBERGLASS PIPE WINDER
4 Claims, 5 Drawing Figs.

[52] U.S. Cl. .................................................. 242/7.23, 156/392, 156/425, 242/76
[51] Int. Cl. ...................................................... B65h 27/00, B65h 81/08
[50] Field of Search .......................................... 242/7.23, 7.22, 7.21, 2, 3, 76, 157; 53/13, 15; 156/392, 425, 446

[56] References Cited
UNITED STATES PATENTS

| 3,301,505 | 1/1967 | McLarty | 242/157 |
| 3,379,591 | 4/1968 | Bradley | 156/425 X |

Primary Examiner—Billy S. Taylor
Attorney—Andrus, Sceales, Starke and Sawall

ABSTRACT: A delivery head used to apply fiber reinforcing bands to a mandrel in making fiber reinforced resin pipe has a reciprocating carriage supporting a regulator head for feeding the bands to the mandrel. The regulator head has a plurality of band regulator sets comprising generally triangular openings through the regulator head, and spaced longitudinally along the mandrel forming a pattern through which the separate fiber bands are applied to the mandrel in a continuous wide band.

PATENTED SEP 7 1971 3,603,517
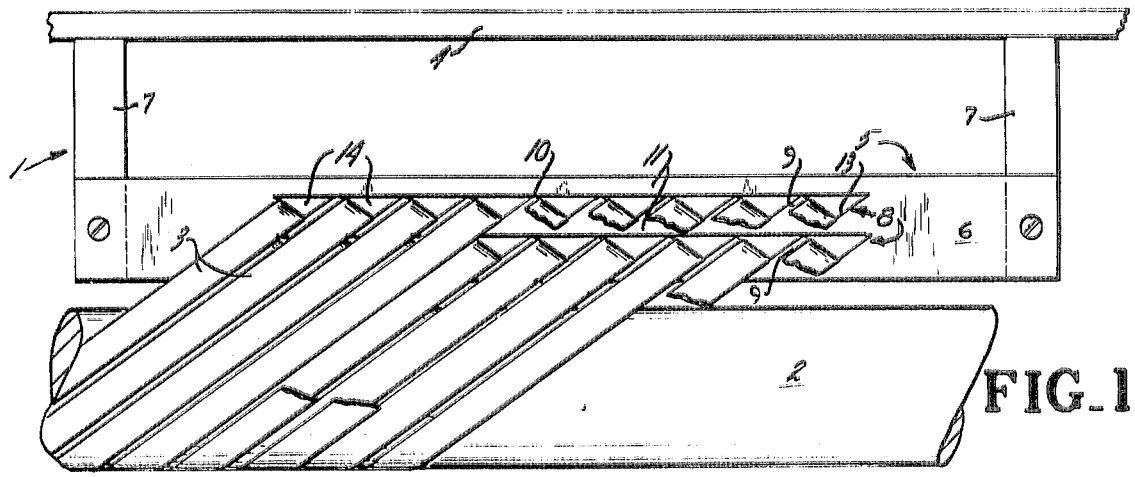
FIG_1
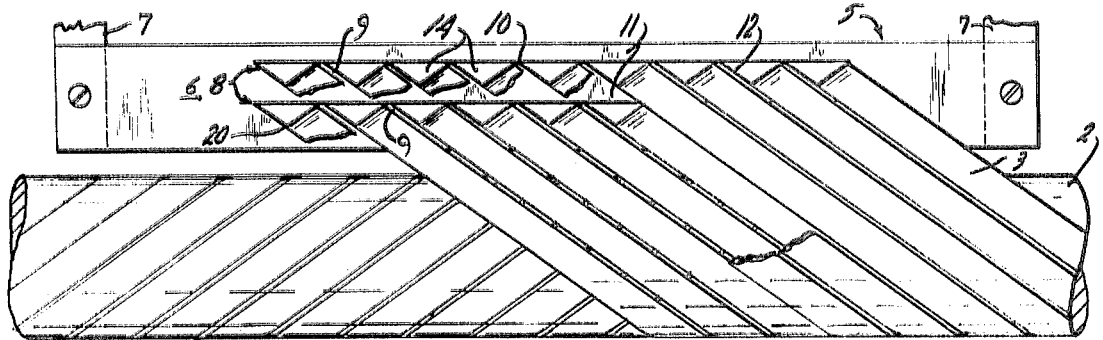
FIG_2
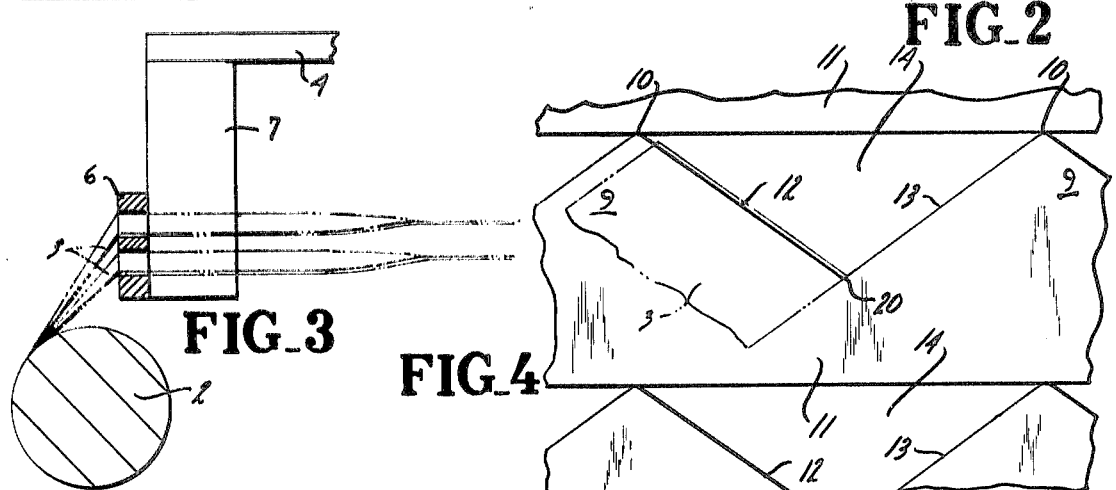
FIG_3  FIG_4
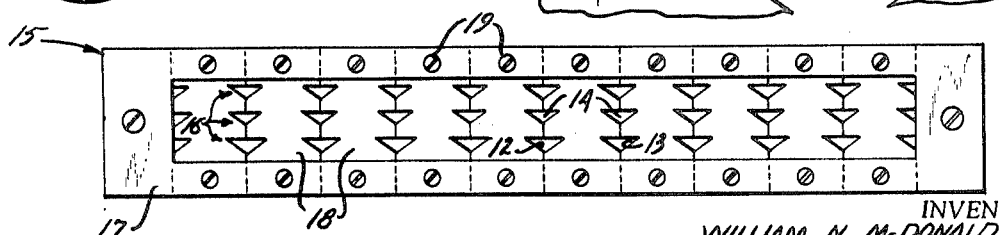
FIG_5
INVENTORS
WILLIAM N. McDONALD
WILLIAM M. HOGAN
BY
Andrus, Sceales, Starke & Sawall
Attorneys

FIBER BAND REGULATOR FOR FIBERGLASS PIPE WINDER

This invention relates to a mandrel winding apparatus and more particularly to a delivery head and regulator for winding fiber reinforcing bands on a mandrel to make fiber reinforced resin tubular articles.

BACKGROUND OF THE INVENTION

Fiber reinforced resin pipes and tubular articles can be made by winding a band of reinforcing fiber strands, such as of fiberglass, on a rotating mandrel. For strength, the band is wound in a helical pattern and in several superimposed layers. This is done by feeding the band through a reciprocating delivery head, which runs back and forth along the length of the rotating mandrel while applying the band. After the band is wound, the article is cured and the mandrel stripped from the completed pipe or tubular article.

While it is desirable to apply a wide band to the mandrel, rather than a single strand or a plurality of separate filaments, this process presents difficulties never adequately solved by the prior art. The wide band tended to bunch up, particularly at the end of the reciprocating strokes of the delivery head and even distribution of the fiber reinforcement was hampered.

It has been found that a series of more narrow bands, collectively wound to result in the structure which could have been made with one wide band, can be used to give more even distribution of the reinforcing fibers over the mandrel. To date, the series of more narrow bands have been applied by the use of slippers, or band dividers spaced circumferentially about the mandrel. The bands would be fed to the slippers, and over guides to the mandrel. Two guides would be provided for each separate band for each direction of reciprocating motion of the delivery head.

However, these structures did not fully solve the problems of bunching of the bands and did not provide sufficiently even and continuous distribution.

Further, additional problems arose in this manner of winding. The separate bands could not be applied accurately, or consistently with respect to the position of the other bands, and control of overlap was not adequately provided for. Another difficulty was that the structures devised could not be used to apply large numbers of bands at one time, and thus partially destroyed the advantage of wide band helical winding.

The slipper devices were capable of fouling the separate bands, especially at the ends of the reciprocating strokes, possibly tying up the entire winding operation. The guides were not adequate means for containing the bands, which could at times slip, causing unacceptable deviations in the wound article. Fouling could also occur because of the difficulty in feeding the circumferentially spaced slippers. Sticky substances, such as resins, were often impregnated in the fibers, and the slipper means could not maintain adequate separation of the bands, possibly resulting in contact between bands before they were positioned for application by the guides. This could cause fouling and further uneven winding.

SUMMARY OF THE INVENTION

The apparatus of the invention provides a regulator head which is capable of applying a large number of bands, collectively to form a wide band, and which provides accurate and consistent winding without the dangers of fouling which hampered prior, slipper devices.

In the apparatus of the invention, a feeder carriage which reciprocates along a mandrel supports a delivery head. The regulator head is attached to the delivery head so as to extend longitudinally of the mandrel in operation. A plurality of band regulator sets comprising holes through the regulator head are formed in a pattern providing spaces through which separate fiber bands run and are distributed to the mandrel in a continuous wide band formation.

This longitudinal spacing of the band regulators permits a large number of separate bands to be wound at one time. The holes are open only through the regulator head and the bands are thereby prevented from slipping out. The band regulator formation provides surfaces over which each band is confined to run during the winding operation, without appreciable variation in band position. As the carriage switches directions, the bands are instantly directed over a second set of surfaces of the band regulator formation with similar accuracy of position.

The plurality of regulator sets are disposed vertically with respect to each other, and thereby distribute the adjacent bands so that they are in contact on the mandrel, but spaced adequately apart between the feeder mechanism and the regulator head, thus avoiding fouling.

The device is advantageously uncomplicated to make and maintain, and yet performs more satisfactorily than any previous device. The parts are rigidly attached and nothing therein is susceptible to bending or wear.

These and other advantages are described more particularly below.

In the drawing:

FIG. 1 is a plan view of the apparatus of the invention;

FIG. 2 is another plan view of the apparatus of the invention showing the carriage moving in the opposite direction;

FIG. 3 is a cross section view of FIG. 1;

FIG. 4 is a closeup view of part of FIG. 1; and

FIG. 5 is a view similar to FIGS. 1 and 2, showing a modified regulator head.

DESCRIPTION

The drawings illustrate a fiber band delivery assembly 1 disposed adjacent and at the side of a winding mandrel 2 with a series of fiber bands 3 running through delivery assembly 1 and being wound over mandrel 2 to form a tubular article such as a pipe.

Bands 3 can be formed of a plurality of fiber strands, woven fabric, or matting and the like, and the reinforcing fiber strands can be various fibers, such as glass, natural or synthetic fibers. The strands can be impregnated with suitable thermosetting resin, such as plastic, which when wound and cured, provide strong tubular sections highly resistant to chemicals and weather.

For mounting to a winding machine, not shown, a reciprocating carriage 4 extends to adjacent mandrel 2. Carriage 4, in cooperation with the winding machine, reciprocates longitudinally across mandrel 2, consistently from one point to another to form a section of pipe of that length.

Attached to carriage 4 is a delivery head 5 which accomplishes the even application of bands 3 to the mandrel. For this purpose, delivery head 5 has a regulator head 6 rigidly connected by suitable means, such as screws, to carriage arms 7 extending along the mandrel from carriage 4. Regulator head 6 can be in the form of a metal plate for sufficient strength, is spaced from mandrel 2, and extends longitudinally of the mandrel. Provided on regulator head 6 are two band regulator sets 8 through which fiber bands 3 run in operation. Each set 8 comprises a plurality of guide teeth 9 formed uniformly in a row longitudinally of mandrel 2 in service. Guide teeth 9 each has a vertex 10 and is adjacent to the next consecutive guide tooth 9 at their respective bases. This structure gives the appearance of a sawtooth pattern and provides a series of band regulator openings of triangular configuration with vertices toward the mandrel. To confine bands 3 to guide teeth 9, a top plate 11 extends across the vertex 10 of each tooth and similarly, another top plate 11 covers the teeth 9 of the other set 8.

Guide teeth 9 thus each provide a forward guide surface 12 and a rearward guide surface 13 for each band 3, and in cooperation with top plates 11 provide a confined band regulator guide passage 14 for each band. The structure of the teeth 9, and plates 11, can be formed as an integral piece with guide passages 14 being formed as by stamping through regulator head 6. Surfaces 12 and 13 are smooth, so as to protect the fiber bands running across them.

To adjust the bands to the proper helical winding angle, guide surfaces 12 and 13 are linear and in planes at the helical winding angle desired. These planes may be altered to vary the winding angle to provide any helical pattern desired.

The band regulator sets are disposed vertically to each other, with each vertex 10 in vertical line with a corresponding vertex of the guide tooth 9 in the other set 8. Bands 3 are distributed among guide passages 14 so that they alternate, one band 3 being in the first set, the next being disposed through the passage which is vertical to the first, and thusly to the end of band regulator sets 8. This vertical displacement controls the overlap of uniform width bands being applied to mandrel 2 and, for given surfaces 12 and 13 and a given helical winding angle, may be varied to vary the overlap. The band width can also be varied to change the overlap, but should be of sufficient width so as to cooperate properly with guides 14. Further, by this manner of guiding bands 3, the delivery head 5 keeps the bands separated between the band feeder mechanism, not shown, and regulator head 6.

In operation, bands 3 are first strung from a feeder apparatus, not shown, through their respective band guides 14 and thus through regulator head 6 to mandrel 2 and there secured in any suitable manner. Bands 3 should have relatively little slack and thus will be in continuous contact with either surfaces 12 or 13, depending on the position of carriage 4.

The assembly is now ready for winding a tubular article and mandrel 2 is rotated, drawing bands 3 around its surface. Carriage 4 reciprocates longitudinally from one point to another along the mandrel, thus causing fiber bands 3 to wind around mandrel 2 in the desired helical pattern. Speed control of the rotating mandrel and reciprocating carriage 4 is accomplished in the conventional manner and will largely determine the winding pattern. For more accuracy, guide surfaces 12 and 13 have been disposed at the desired helical angle. Being extended through passages 14 without appreciable slack, bands 3 are compelled to run across guide surfaces 12 when carriage 4 is moving to the right. At proper carriage speed, the bands will consistently run at the bottom portions of surfaces 12 near the vertices of band regulators 14, with no portion of each band ever losing contact with the surface. In case of buckling, or other sudden variations in the application, bands 3 cannot slip out of passages 14 to cause fouling; nor can the bands vary appreciably from normal running position over surfaces 12, returning quickly when slippage does occur. Bands 3 are thus caused to run smoothly through band regulator guide passages 14 to be accurately and uniformly applied to mandrel 2.

When carriage 4 switches direction to the left, bands 3 immediately are drawn against guide surfaces 13 for similar operation as in the opposite direction. After several reciprocating motions, sufficient layers of fiber have been applied, the operation is stopped, and bands 3 severed from the mandrel. Curing and stripping of the tubular article is done in the conventional manner.

A variation of the regulator head of the invention is shown in FIG. 5. Regulator head 15 is attached to a similar carriage and in the same relation to a mandrel as in the first embodiment. The differences in the second embodiment is that three band regulator sets 16, rather than two sets, are provided in vertical relationship and have band regulator guide passages 14 structured generally the same as in the first embodiment, with guide surfaces 12 and 13.

A further variation in structure is that regulator head 15 is not formed in one integral piece, but has a baseplate 17 forming the periphery of head 15 and a plurality of center plates 18 attached as by screws 19 to baseplate 17. In each center plate 18, indentations are cut at their vertical edges, which when the plates are assembled, cooperate with the indentations on adjacent plates 19 to form generally triangular-shaped band regulator openings 14. To provide the desired continuous wide band for the mandrel, the three sets 16 of this embodiment, have a horizontal displacement between band regulator openings 14. Thus, teeth 9, as in the first embodiment, are not provided in the modified form. However, passages 14, with guide surfaces 12 and 13, are the same in both embodiments. Both embodiments have similar triangular shapes for passages 14, with guide surfaces 12 and 13 forming opening vertices 20 at the lower portion of the passages. Vertices 20 for each set 16 are in vertical alignment with those of corresponding passages 14 of the other sets 16.

In operation, bands are inserted through passages 14 in a consecutive order, from the furthest passage in the top set 16, to the corresponding passage in the middle set 16, then to the bottom, and then to the next vertical row and so on until the sets each have one band. In winding, the operation is essentially the same as in the first embodiment, but a wider collective band is wound at one time. Further modification, as by adding additional sets 16, will provide even more advantages in this respect.

The invention provides means for applying fiber bands to a mandrel for making fiber reinforced tubular articles wound in a helical pattern. The invention permits a wide fiber band to be applied, but avoids fouling, inaccuracies and inconsistencies in the winding pattern for more uniform helically wound articles.

The several embodiments described are the best examples presently contemplated of the various modes of the invention. The following claims particularly point out and claim the subject matter regarded as the invention.

We claim:

1. In a winding machine having an elongated mandrel for winding thereon at a helical angle a plurality of fiber reinforcing bands to make fiber reinforced tubular articles, a delivery head comprising,
   a carriage connected to the winding machine and driven by said machine to reciprocate longitudinally along the mandrel in service,
   a regulator head attached to the carriage and spaced adjacent the mandrel, said head including a plate member extending longitudinally of the mandrel, and
   a plurality of band regulator sets spaced vertically in the regulator head, said sets comprising a series of uniform band regulator openings through the plate member and spaced longitudinally of the mandrel, said openings being generally triangular in configuration with two sides of each triangle defining a pair of guide surfaces extending generally at the desired helical angle with respect to the mandrel and meeting at a vertex, the vertex of each band regulator being in a vertical line with the vertex of corresponding band regulators of other sets, the vertices in each said set being on a horizontal line, said band regulators being disposed to carry one fiber band apiece alternately in accordance with alternate carriage motions at the portion of the respective guide surface near the vertex, and the band regulators being positioned with respect to the others to apply the fiber bands in a consecutive order with one band overlapping the preceding band to provide one continuous wide band on the mandrel.

2. The delivery head defined by claim 1, wherein a sufficient number of band regulators are provided to apply at least ten separate fiber bands at one time, and the guide surfaces being of sufficient length to accept separate fiber bands having a width of at least three-eighths inch.

3. In a winding machine having an elongated mandrel for winding thereon at a helical angle a plurality of fiber reinforcing bands to make fiber reinforced tubular articles, a delivery head comprising,
   a carriage connected to the winding machine and driven by the machine to reciprocate longitudinally along the mandrel in service,
   a regulator head attached to the carriage and having a plate member spaced adjacent and extending longitudinally to the mandrel, and a plurality of band regulator sets comprised of a series of openings through said plate, said openings being generally triangular in configuration with two sides of each opening defining a pair of guide surfaces extending generally at the desired helical angle with respect to the mandrel, the guide surfaces meeting generally at a vertex at the surface ends closest the mandrel, whereby a guide surface is provided by each said regulator for each direction of travel of the carriage.

4. In a winding machine having an elongated mandrel for winding thereon at a helical angle a plurality of fiber reinforcing bands to make fiber reinforced tubular articles, a delivery head comprising:

a carriage connected to the winding machine and driven by the machine to reciprocate longitudinally along the mandrel in service;

a regulator head attached to the carriage and including a plate member extending in spaced relation longitudinally of the mandrel; and a plurality of band regulator sets comprised of a series of band regulators being openings through said plate, each band regulator providing a pair of guide surfaces, one for each direction of carriage motion, the guide surface being spaced longitudinally of the mandrel and extending generally linearly at the desired helical angle with respect to the mandrel, said band regulator sets being vertically spaced, the band regulators being uniform in size, with band regulators in each set being vertically disposed to corresponding band regulators in each other set to dispose the guide surface pairs of corresponding band regulators on vertically spaced lines, and the vertical spacings of adjacent sets and the horizontal spacings of band regulators in each set are uniform and predetermined to apply separate bands to the mandrel in one continuous wide fiber band.